G. CLAUDE.
SYSTEM OF ILLUMINATING BY LUMINESCENT TUBES.
APPLICATION FILED NOV. 9, 1911.
1,125,476.
Patented Jan. 19, 1915.
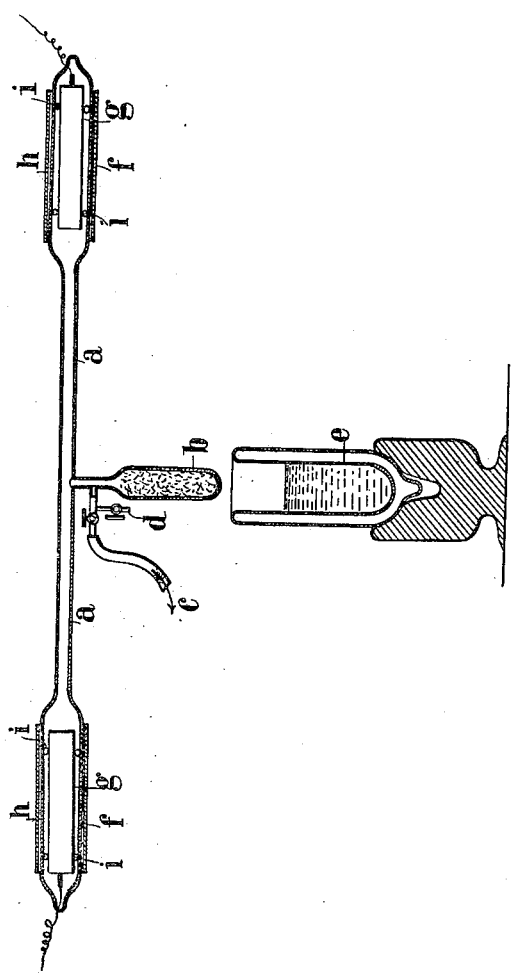
WITNESSES
Olive D. White
Helen S. Morris.
INVENTOR
Georges Claude
BY
Emil Bönnelycke
ATTORNEY

UNITED STATES PATENT OFFICE.

GEORGES CLAUDE, OF PARIS, FRANCE.

SYSTEM OF ILLUMINATING BY LUMINESCENT TUBES.

1,125,476.  Specification of Letters Patent.  Patented Jan. 19, 1915.

Application filed November 9, 1911. Serial No. 659,360½.

*To all whom it may concern:*

Be it known that I, GEORGES CLAUDE, a citizen of the Republic of France, residing at 48 Rue St. Lazare, Paris, in the Republic of France, have invented certain new and useful Improvements in Systems of Illuminating by Luminescent Tubes, of which the following is a specification.

In the specification annexed to a French patent filed in the name of Mr. Georges Claude on the 7th March 1910 and which relates to lighting by luminescence of the rare gases of the atmosphere and especially of neon it has been pointed out that the properties of these gases are very largely attenuated by the presence of traces of other gases and particularly of nitrogen. Consequently (and with the exception, in accordance with one of the characteristics of the prior invention referred to above, of the method of separate scavengings with a specially prepared and absolutely pure gas) it is necessary to employ an exceedingly efficacious purification process on the spot in order to attain a high degree of purity of the neon which fills the tubes notwithstanding the liberation of the gases occluded in the walls or in the electrodes during the "formation" of the said tubes.

The accompanying drawing illustrates an embodiment of the invention in which the luminescent tube is shown during its formation.

Some particulars as to the formation will be given here and it will be recalled or observed that the essential feature of the process consists in providing the tubes $a$ with receptacles $b$ filled with wood or cocoa nut charcoal which at the temperature of the liquid air will absorb the impurities of the rare gases employed or the air introduced owing to defective manipulation, or the occluded gases in proportion as they are liberated.

The preferred operative method consists in alternating during the passage of the current exhaustion by means of the vacuum pump $c$ and the admissions of neon at $d$ until the tubes have been appropriately scavenged; the pump $c$ is then cut off and the desired charge of neon is admitted to the tube; the carbon receptacle $b$ is then immersed in the liquid air $e$ in continuing to cause the current to pass at intervals until the last detrimental traces of foreign gases are absorbed and the tube not only acquires its full brilliancy but retains it indefinitely. The lamp is then separated from the carbon receptacle $b$ and the tube is ready.

It should however be noted that until the moment the electrodes cease to "yield" it is necessary that the tubes should be subjected to currents which are much greater than the current that they have to withstand in normal use as otherwise no matter what period of time was occupied in the formation the electrodes might "yield" current in service and the tube would lose a large proportion of its brilliancy, at all events temporarily. The same result can also be obtained by enveloping the portion $f$ of the tube $a$ which contains the electrodes $g$ with heat insulating substances $h$ such as asbestos paper and so forth during this formation in such a manner as to facilitate heating them to a high temperature. In order to avoid direct contact between the electrodes $g$ and the portions $f$ of the glass which would be fatal at the high temperatures reached the electrodes can be separated from the glass by means of two collars of glass beads $i$ for example.

It may be mentioned as an interesting peculiarity of the formation that the carbon tubes may be heated right at the commencement during the first period of pumping in such a manner as to facilitate the exhaustion of the gases that they contain and they may then be allowed to cool slowly to the ambient temperature as soon as the void is sufficient because their faculty of absorption is then cumulative to that of the vacuum pump for facilitating the initial passage of the current which it is always a lengthy operation to obtain.

An important observation has also been made as regards the electrodes $g$. These electrodes may be of carbon, iron, copper, aluminium and so forth and it has been found that if as in the first experiments they are too small they become heated enormously on the passage of the current owing to the considerable drop in potential which occurs at this place.

Now in these conditions with iron or copper electrodes for example the neon disappears somewhat rapidly, the resistance of the tube increases and after some score hours it becomes extinguished. Simultaneously the electrodes undergo rapid vaporization and it has been found that the deposit formed upon the walls of the tube in proximity to the electrodes contains a large quantity of neon, a fact which is very curious and quite contrary to what might have been expected. There is therefore a combination of the metal of the electrode or at all events vigorous occlusion as regards these gases which are reputed to be inert and it is this combination which would cause the progressive disappearance of the gas. Attention having thus been fixed to this point it has been ascertained that this combination is a function of the rapidity of the vaporization; if the surface of the electrode is sufficiently large for the heating to be small the vaporization is smaller and the disappearance of the neon is very slow and a very long life of the tube may be obtained by this method. This fact is very remarkable indeed, and constitutes a highly useful and unexpected discovery, the conditions thus realized constituting in effect the only case known where a discharge tube of any kind can actually operate practically indefinitely without renewal of the gas. It is known for instance that the "Crookes'" tubes used for radioscopy become "hard" after a certain time, and that it is absolutely necessary to introduce hydrogen into these tubes in order to permit them to be again used. It is also known that nitrogen or carbonic acid in "Moore" tubes is rapidly absorbed and that the maintenance of the tube in good condition strictly requires the employment of a valve which continuously readmits gas. Now if neon behaves in such a different manner it is due to the property hitherto unknown, of being absorbed to a remarkably less degree by the electrodes than all the other gases and especially helium, and it is all the more surprising that in an atmosphere of neon volatilization of the electrodes is much greater than of all the other gases as I have proven in an article contained in the *Comptes Rendus French Academie des Sciences*, bearing date of May 22, 1911. This fact can be amplified, according to the present invention, by the use of very large electrodes, to such an extent that the very important result is obtained that a single charge of neon is sufficient to insure to the tube a very long life, compared with that of incandescent lamps. It is to be understood however that these large electrodes are not used with a view to avoid their fusion or the escaping of the occluded gases by the heating during the passage of the current; their surface is much too large for fusion to be taken into consideration, and it has already been stated that they are submitted during the "formation" to the action of intense currents capable of heating them strongly in spite of their large surface and of causing occluded gases to escape and being removed by absorption in any suitable manner. It has been found that this necessary electrode area is at least 1.5 square decimeters per ampere.

The slowness of the disappearance of the neon is facilitated owing to the fact already pointed out in the specification referred to that the pressure in the neon tubes may be of the nature of a mm. of mercury, that is to say at least 10 times higher than in the nitrogen tubes resulting in a provision of gas which is likewise more than 10 times greater.

In the conditions thus determined the important result is attained that the luminosity of the tubes may remain substantially constant for a very long time without a fresh introduction of gas. In this manner a sufficiently long life may be arrived at for avoiding fresh introduction of gas, the tubes being replaced after use like incandescent lamps.

As is known the color of the light emitted by neon when ignited leaves something to be desired owing to its orange tint partaking too much of a red. It has been found that it tends to become increasingly yellow in proportion as the pressure of the neon decreases; the result is improved in particular as the temperature attained increases that is to say, if the density of the current is greater and it is preferably at these great densities in the nature of an ampere for tubes 45 mm. in diameter that it is desirable to operate except when a pronounced red light is desired. Good results have been obtained in this connection in employing quartz tubes of small diameter furnished with electrodes connected with the exterior by wires (nickel-steel of a null cofficient of expansion); in these tubes the temperature may without difficulty be raised until the light is improved. Except when absolutely pure gas is employed together with successive scavengings as indicated in the prior specification it is necessary to provide these tubes for the formation with a carbon appendix for forming and treating the tube as mentioned above. If these tubes are short they can of course be run with low voltage continuous current, kindling being effected for example by extra current and being greatly facilitated by the exceptional conductivity of the neon. Finally if these tubes are very short and of great luminous intensity they can be combined on the same apparatus with mercury lamps in such a manner as to furnish a total light which is white and very economical.

In the case of long tubes for alternating current or high tension continuous current it should be noted that owing to the small dielectric rigidity of the neon the necessary differences of potential at the terminals are much smaller than with all other gases for example in alternating current 800 volts for a tube of 6 meters in length. This is obviously a great advantage from the point of view of safety. The drop at the electrodes is also much less so that very satisfactory results can be obtained with relatively short tubes say 5 or 6 meters long for example which is not the case with the tubes hitherto employed. This renders it possible to manufacture these tubes at the works and to transport them in a finished state to the place of use.

What I claim and desire to secure by Letters Patent of the United States is:—

1. A luminescent tube containing previously purified neon and provided with internal electrodes for illuminating said gas, said electrodes being deprived of occluded gases and having an area exceeding 1.5 square decimeters per ampere, to decrease the vaporization of the electrodes and prevent the consequent formation upon the walls of the tube, in proximity to said electrodes, of deposits containing said gas, whereby the luminosity of the tube is maintained constant for a very considerable period of time without a fresh introduction of gas.

2. A luminescent tube containing previously purified neon and provided with internal electrodes for illuminating gas, said electrodes being deprived of occluded gases and being supported without direct contact with the walls of the tube and having an area exceeding 1.5 square decimeters per ampere, to decrease the vaporization of the electrodes and prevent the consequent formation upon the walls of the tube, in proximity to said electrodes, of deposits containing said gas, whereby the luminosity of the tube is maintained constant for a very considerable period of time without a fresh introduction of gas.

In testimony whereof I affix my signature in presence of two witnesses.

GEORGES CLAUDE.

Witnesses:
EMILE LEDRET,
DEAN B. MASON.